May 5, 1953  O. B. PAULSON  2,637,131
DISPLAY APPARATUS
Filed July 12, 1951

Ole B. Paulson
INVENTOR.

Patented May 5, 1953

2,637,131

UNITED STATES PATENT OFFICE 2,637,131

DISPLAY APPARATUS

Ole B. Paulson, Belt, Mont.

Application July 12, 1951, Serial No. 236,365

1 Claim. (Cl. 40—130)

This invention relates to new and useful improvements and structural refinements in display apparatus, and the principal object of the invention is to provide an apparatus of the character herein described, which may be conveniently and effectively employed for magnifying and illuminating display photographs, and the like.

Some of the advantages of the invention reside in its simplicity of construction, in its pleasing appearance, and in its adaptability to economical manufacture.

With the above more important objects and features in view, and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
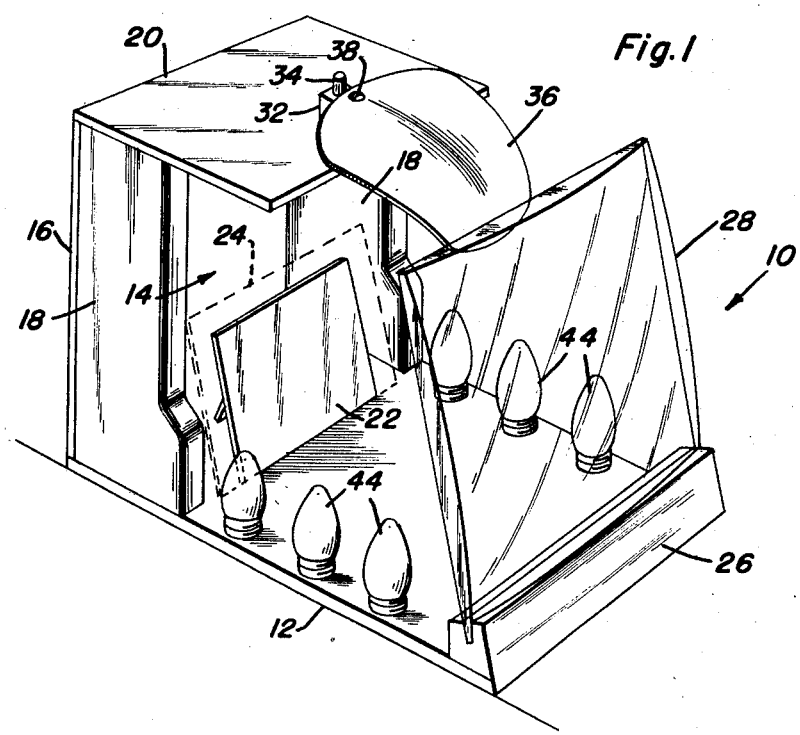
Figure 1 is a perspective view of the invention.

Referring now to the accompanying drawings in detail, the invention consists of a display apparatus which is designated generally by the reference character 10 and embodies in its construction a substantially rectangular base 12, the rear portion of which carries an open-front enclosure or stage 14 including a back wall 16, a pair of side walls 18, and a top wall 20 which overhangs the stage to a substantial extent, as is best shown in Figure 1.

A removable easel 22 is positioned on the stage 14 to support a photograph 24, or the like, which is to be displayed, and a holder 26, carrying a rearwardly inclined lens panel 28, is provided at the front edge of the base so that the photograph is substantially magnified when viewed.

Figure 2:
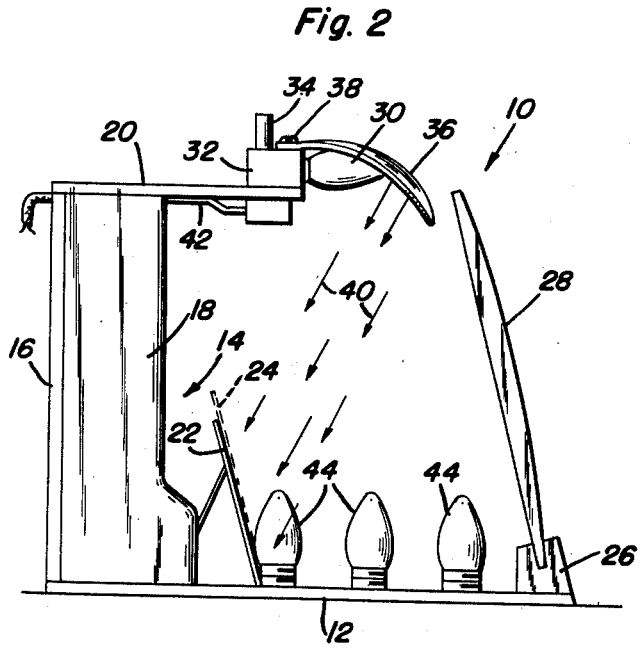
Figure 2 is a side elevational view thereof.

For purposes of illuminating the photograph, the lamp 30, mounted in a socket 32 and controlled by a switch button 34 is supported by the front end or edge portion of the enclosure top 20 and a downwardly and forwardly arcuated reflector 36 is secured by a screw 38 to the socket 32 for purposes of directing light rays from the lamp 30 onto the photograph 24, as indicated by the arrows 40 in Figure 2. The lamp socket 32 is connected by a suitable conductor 42 to a source of electric current.

If desired, suitable ornaments 44, assuming the form of "dummy" lamp bulbs, may be mounted at the sides of the base 12 between the stage 14 and the lens panel 28 to enhance the appearance of the display apparatus.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

In a display apparatus, the combination of a flat base plate having front and rear ends, a vertical back wall provided at the rear end of said base plate, a pair of side walls secured to side edges of the base plate and of the back wall, front edges of said side walls being spaced rearwardly from the front end of the base plate, a top wall secured to top edges of the back wall and side walls and having an overhanging front portion projecting beyond the front edges of the side walls but spaced rearwardly from the front end of the base plate, an easel positioned on the base plate under the overhanging portion of said top wall and adapted to support an article to be displayed, a transverse rail provided at the front end edge of the base plate and formed in the top thereof with a horizontal groove, a lens mounted in said groove and extending upwardly and rearwardly from said rail, the upper edge of said lens being spaced forwardly from the front edge of said top wall, a switch mounted on the upper surface of the front edge portion of the top wall and including a lamp socket, a lamp provided in said socket and projecting forwardly therefrom, and an arcuate reflector secured to said switch above said lamp and having a downturned forward portion disposed adjacent the upper edge of said lens, whereby to direct light rays from the lamp on said easel.

OLE B. PAULSON.

References Cited in the file of this patent

UNITED STATES PATENTS

| Number | Name | Date |
|---|---|---|
| 2,242,040 | Murphy | May 13, 1941 |

FOREIGN PATENTS

| Number | Country | Date |
|---|---|---|
| 926,635 | France | Oct. 7, 1947 |

OTHER REFERENCES

Lighting and Lamps, August 1943, page 14.